Aug. 15, 1933.   H. T. LAMBERT   1,922,962
POWER DRIVEN SWIVELED WHEEL
Original Filed April 19, 1930   3 Sheets-Sheet 1
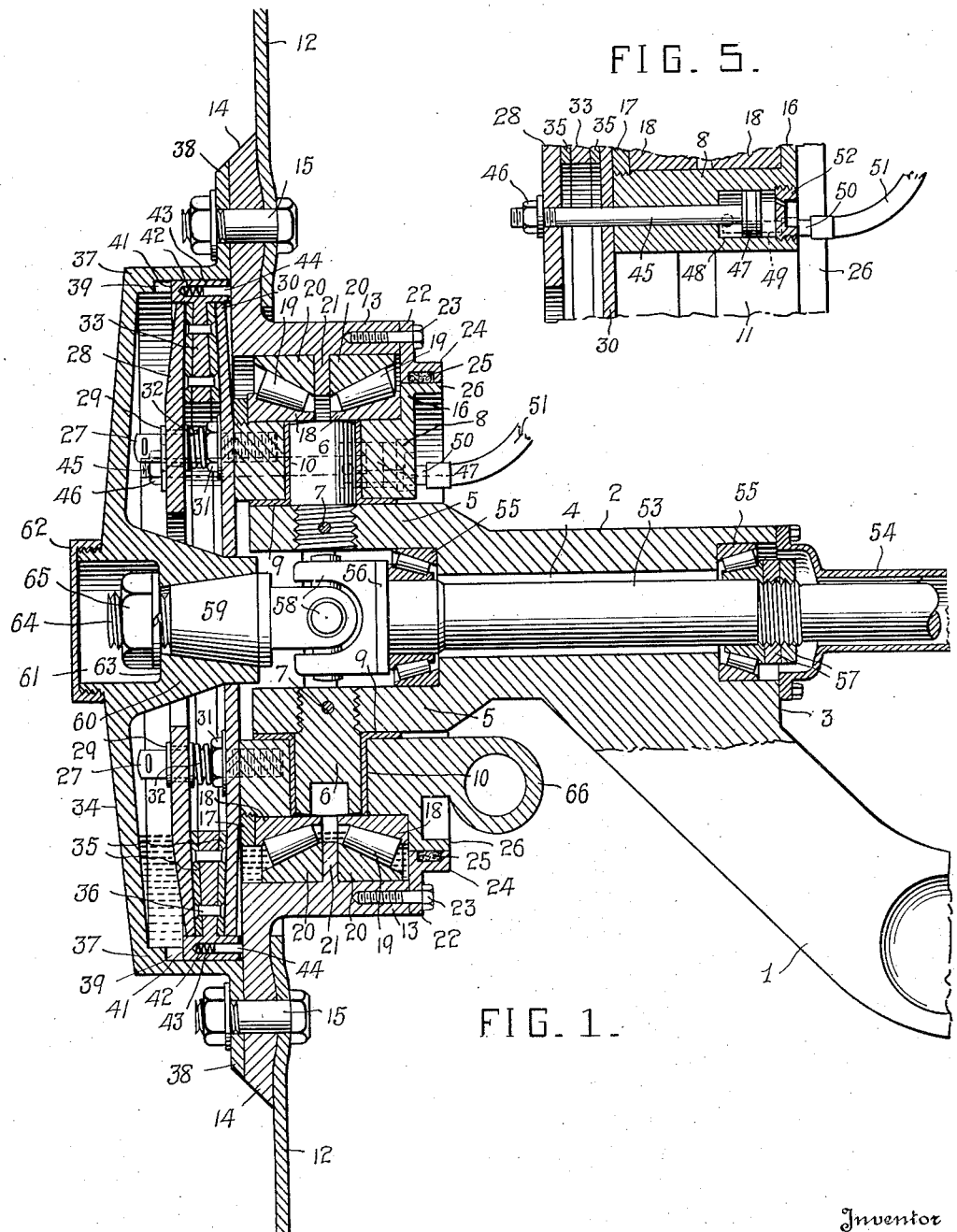
Inventor
H. T. LAMBERT
By Edgar M Kitchin
his Attorney

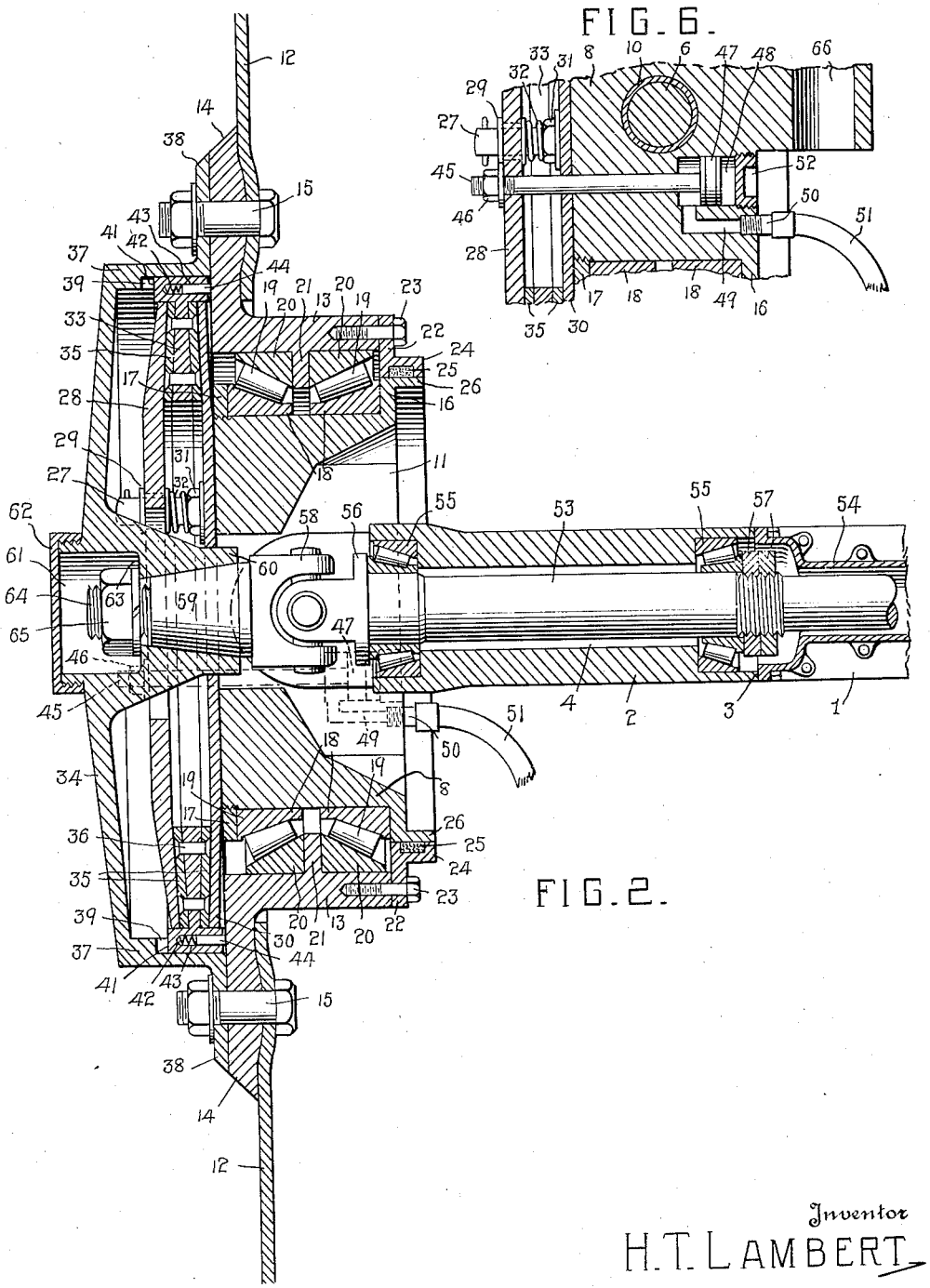

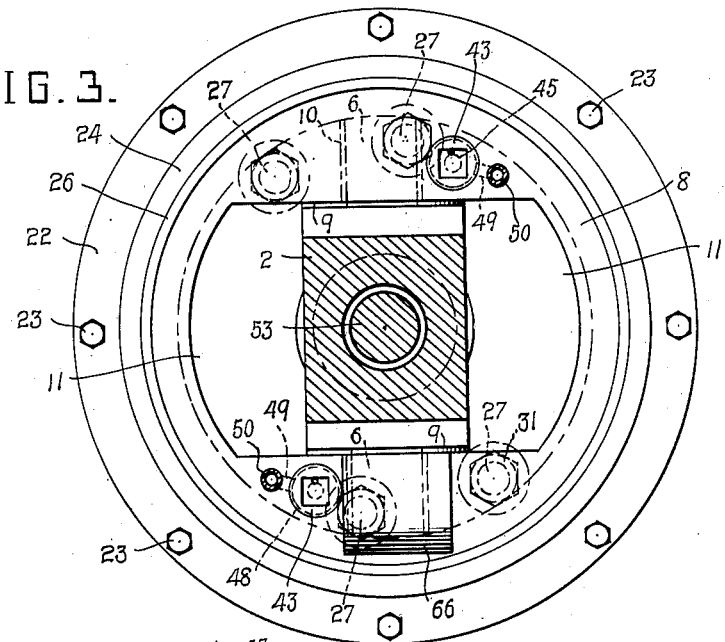
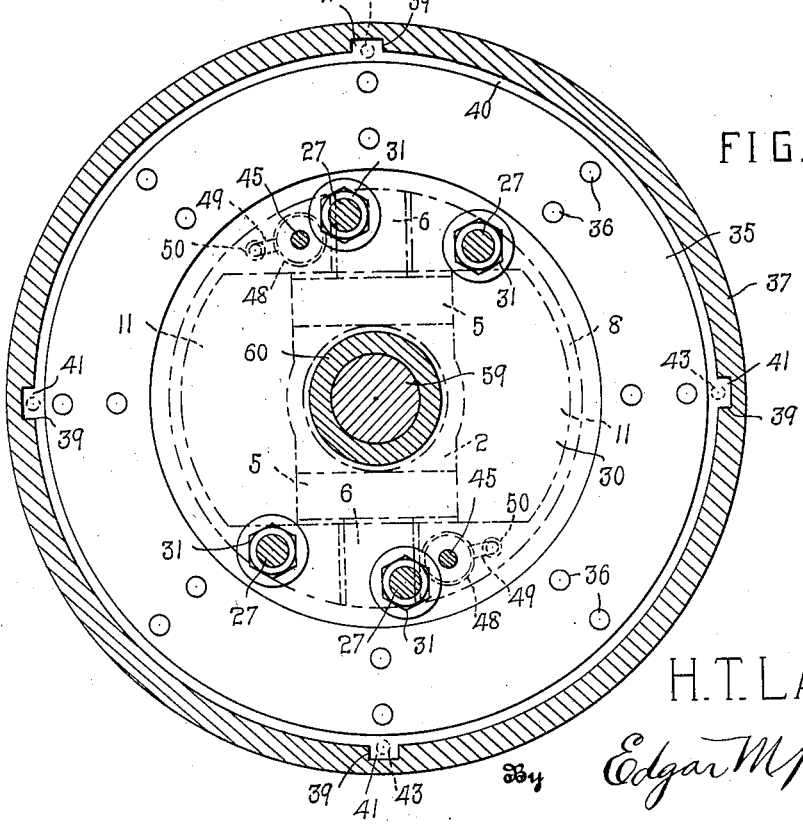

Patented Aug. 15, 1933

1,922,962

UNITED STATES PATENT OFFICE 1,922,962

POWER DRIVEN SWIVELED WHEEL

Homer T. Lambert, Huntington, W. Va.

Application April 19, 1930, Serial No. 445,713
Renewed January 13, 1933

9 Claims. (Cl. 180—43)

This invention relates to improvements in swiveled carrier wheels, and has as its essential object improving that type of swiveled wheel to which power is delivered, and as a corollary object the improvement of the means for delivering power to such a wheel.

A more detailed object is the delivery of power to a wheel so swiveled as to be substantially free from torsional stresses.

With these and further objects in view as will in part hereinafter become apparent and in part be stated, the invention includes a swiveled connection for a carrier wheel for connecting the same directly to the rigid part of a supporting axle, and means for transmitting power to the wheel without interfering with its capacity to swivel.

The invention also comprehends in a device as just stated the location of the driving element in a position extending through the wheel with its axis coincident with the axis of the wheel.

The invention still further involves the employment in a structure as last described of a flexible joint in the power delivering means located substantially in the line of the swivel axis.

The invention comprises certain other novel constructions, combinations, and arrangements of parts as will be subsequently specified and claimed.

In the accompanying drawings,—

Figure 1 is a vertical, central section through a wheel structure and cooperating parts embodying the features of the present invention, parts being seen in elevation.

Figure 2 is a central section through the same parts taken on substantially a horizontal plane, and parts being seen in plan.

Figure 3 is a vertical section taken approximately on the plane indicated by line 3—3 of Figure 1, and looking in the direction indicated by the arrow, parts being seen in elevation.

Figure 4 is a transverse, axial, vertical section taken through the hub cap and its driving connections, the planes of the section being offset for inner areas to show the braking ring of the hub cap in elevation and the brake-disc guiding studs in section between the inner terminals of the spring and the tool-receiving bosses thereof.

Figures 5 and 6 are fragmentary, detailed horizontal and vertical sections, respectively, through one of the brake-applying piston connections, the piston and certain other parts being seen in elevation and plan, respectively.

In my co-pending application Serial No. 249,331, filed January 25, 1928, for improvements in Swiveled wheels and axles therefor, and in my divisional application thereof Serial No. 438,222, filed March 22, 1930, for improvements in Swiveled wheel brakes, I have illustrated and set forth certain improvements in wheel structures adapted for the front of automobiles and like vehicles and elsewhere where carrier wheels require the swiveled mounting for performing the several functions for which they are intended, and the present invention provides to add to those functions that of power delivery to and receipt by such wheels without detracting any of the other functions.

Referring to the drawings by numerals, 1 indicates a rigid, load-carrying axle, such, for example, as the front axle of an automobile, or like vehicle. Axle 1, however, radically departs in its terminal constructions from conventional axles, and differs radically in its wheel connections in that stub axles are not employed. Both end portions of axle 1 are identical, and one such end portion alone, therefore, has been illustrated in the accompanying drawings and will be specifically described with the understanding that such description equally applies to the other. The main horizontal portion of axle 1 near each terminal is bent or otherwise extended upwardly on an incline, and at the terminus of the upward, inclined portion an abruptly offset horizontal portion 2 is provided presenting a free end exposed outward and an abrupt shoulder 3 exposed inwardly. The portion 2 is bored horizontally, axially to form a passageway 4, and the outer extremity of the portion 2 is bifurcated to provide upper and lower ears 5, 5, the bore 4 extending to and opening between the ears 5. Detachably fixed to and upstanding from the upper ear 5 and detachably fixed to and extending downwardly from the lower ear 5 are trunnions 6, 6, each preferably detachably connected to its respective ear by being threaded into the same, and further preferably locked as by the insertion of a retaining pin 7 passing through adjacent portions of the respective ear 5 and through the threaded portion of the respective trunnion. The outstanding portions of the trunnions 6 are, of course, smooth and extend into bearing recesses formed radially in a swiveled hub 8 mounted to swing horizontally on the ears 5. Wear plates of bearing metal 9, 9 are preferably provided for the upper face of upper ear 5 and lower face of lower ear 5, and bushings 10, 10, extend from the wear plates 9 to line the respective recesses of swiveled hub 8 for receiving the trunnions 6. As best seen in Figures 2 and 3, the swiveled hub 8 is formed with a central opening or passage for accommodating the ears 5 of axle portion 2, and such passageway is enlarged at 11 to enable free horizontal swinging of the swiveled hub 8 on trunnions 6.

A carrier wheel 12 is appropriately journaled on swiveled hub 8 to rotate freely about the same and be retained in operative position thereby. The wheel 12 is preferably of any conventional type, such as commonly employed in automobile construction, and the method of mounting of the wheel on the swiveled hub 8 is capable of a wide range of variation, and form of which functioning efficiently will be acceptable for the purposes of the present invention. One such form is specifically illustrated as consisting of a wheel hub 13 flanged at 14, secured by detachable bolts 15 to the wheel 12. Disposed between the wheel hub 13 and the swiveled hub 8 are interlocking bearing means destined to reduce friction between the wheel 12 and hub 8, and at the same time lock the parts against axial separation. Naturally, a wide range of modification of the details of these parts is possible without in any way departing from the spirit, intent, and purpose of the present invention. The specific devices illustrated include an upstanding flange 16 at the inner end of swiveled hub 8, and a detachably-mounted ring flange 17 at the outer end of the said hub, the said ring flange being preferably in the form of a nut threaded onto the hub 8. Between the flanges 16 and 17 are located bearing raceways 18, 18, having inclined faces facing toward each other and edges abutting respectively the flange 16 and the flange 17. The raceways 18 are rings snugly mounted on the main or cylindrical peripheral portion of hub 8 between flanges 16 and 17. Appropriate bearings of any well known form 19, 19, are mounted on raceways 18 and cooperatively engage the inwardly-presented inclined faces of opposing raceways 20, 20, which latter raceways are rings snugly seated in the inner periphery of the hub 13. An annular partition flange 21 extends inwardly from the inner periphery of hub 13 between and against which the raceways 20 abut, whereby the hub 13 and parts carried thereby are effectively retained against axial dislodgment by rotating freely on the hub 8. Axial withdrawal and replacement may, of course, be accomplished by first detaching the ring nut or flange 17.

The bearings between the wheel hub 13 and the swiveled hub 8 may be housed and sealed against dust in any of various ways, as, for instance, by the provision of a sealing ring 22 detachably secured to the inner end of hub 13, as by bolts 23, the ring 22 extending from the wheel hub 13 to the periphery of flange 16. The inner peripheral portion of ring 22 is preferably provided with an appropriate annular, inwardly-opening, packing housing 24 for containing absorbent material or other appropriate packing 25 for face contact with the periphery of flange 16, and to enlarge the bearing for such absorbent material, the flange 16 is provided with an annular, laterally-extending flange ring 26 with the peripheral surface of which the packing 25 contacts.

Outward beyond the end of the section 2 of axle 1 and beyond the outer end of swiveled hub 8 and wheel hub 13 is located in appropriate brake which may be constructed to effectively seal the outer end of the annular space between hubs 8 and 13 to retain lubricant in said annular space.

So far as the present invention is concerned, such brake mechanism may have a very wide variation in details of construction, and may, in fact, be omitted without in any way varying the function of power delivery to the swiveled wheel, but it is important to note that there is the possibility of the presence of such brake mechanism for controlling swiveled wheel accommodated with facility in combination with the driving mechanism, and, therefore, the specific embodiment of braking means illustrated will be briefly described.

Guiding studs 27, 27 are provided with threaded inner end portions threaded into and extending axially outward from the swiveled hub 8. Obviously, studs 27 may be otherwise detachably fixed to the hub. As seen best in Figure 4, four of the studs 27 represent an acceptable number appropriately spaced, but, of course, a greater or less number may be employed and otherwise spaced as desired. The exposed portions of the studs 27 are smooth to serve as supports and guides for a brake member 28 which is preferably in the form of an annulus, but because of its correspondence in contour and function with the common disc clutch and disc brake may properly be referred to as a disc. The disc 28 is preferably bushed, at 29, to provide the sliding bearings for the studs 27. Spaced inward from the braking disc 28 is a cooperating braking disc 30, which also is, in fact, an annulus, since it is centrally apertured to accommodate parts hereinafter described. This latter disc 30 is anchored to the swiveled hub 8 by the stud bolts 27 whose threaded portions extend through the disc 30 into the body of the swiveled hub 8. An appropriate shoulder, such as a hexagonal tool-receiving part 31 is preferably formed integral with each stud 27 at the outer terminus of the threaded portion, so that the said shoulder engages the outer face of the disc 30 and clamps the disc to the outer face of the swiveled hub 8 when the stud is threaded home. The disc 28 is preferably resiliently stressed outward away from disc 30 by any appropriate spring or other elastic means. One form of such stress-producer consists of a plurality of coiled springs 32, one surrounding each of the studs 27 and resting at one end against the respective shoulder 31, and at the other end against the disc 28 or the inner flange of the respective bushing 29. Thus separation of the discs 28 and 30 from a braking position when released is insured.

Interposed between discs 28 and 30 is a braking ring or annulus 33 axially slidingly carried by a hub cap 34 which houses the braking mechanism and is detachably anchored to the wheel 12, as hereinafter specifically described. The annulus 33 may be given any appropriate side of face contour to correspond to cooperating face contours of discs 28 and 30, an acceptable form consisting in shaping the annulus 33 with its side faces converging in an outward direction, so that a cross section through the body of the disc presents the frustum of a cone, and, when this form is employed, the outer portions of discs 28 and 30 are dished as shown in the drawings to insure maximum surface contact. The braking annulus 33 is preferably lined at both faces with appropriate brake linings 35, 35, which may be secured in place in any well known manner, such as by through rivets 36.

The hub cap 34 is proportioned to entirely cover and outstand beyond the outer end of the hub 13, and is preferably formed with a cylindrical, peripheral portion 37 flanged radially at 38 to receive the bolts 15 for anchoring the hub to the wheel 12. As a convenient form of assemblage for purposes of increased strength, flange 38 is preferably disposed in face contact with the outer face of flange 14. The inner periphery of cylindrical portion 37 of hub 34 is provided with grooves 39 extending in a direction parallel to the axis of rotation of the hub cap and opening at the inner end of the hub cap. The annulus 33 at its outer edge is provided with opposing, lateral flanges producing a T-head 40 from which outstands lugs 41, 41, one for each groove or recess 39 proportioned to snugly fit the groove and to slide freely therein. The lugs 41 thus afford keys for locking the braking annulus 33 to the hub cap 34 to rotate therewith while leaving the ring free to shift axially. The annulus 33 is resiliently stressed axially outward for insuring relaxing from a braking position, and such stress may be exerted by any of numerous appropriate cushioning means, one form of which is illustrated in the accompanying drawings to consist of springs 42, 42, seated in pockets 43, 43, and disposed to stress the ring 33 outward by reacting against an appropriate part of the wheel 12. The several pockets 43 are preferably arranged parallel to the axis of rotation and open toward the wheel 12. A plunger 44 is preferably disposed in each pocket 43 and interposed between the wheel 12 and the respective spring 42, the plungers engaging the outer face of the flange 14 of the hub of wheel 12. Thus, when the parts are released, after a braking action, the springs 32 shift disc 28 axially outward to the open or released position, and the annulus 33 follows outward to a released position under the stress of springs 42. Obviously, the actual movement of these parts is very slight, being only sufficient to represent the difference between a gripping engagement of the respective faces of the parts and a released position where the annulus 33 may rotate freely.

The braking operation may be caused to occur by any appropriate instrumentalities, such, for example, as mechanism apparatus extending through the hub 8 somewhat after the manner indicated in my above identified, copending applications. For the purpose of the present embodiment of the invention, however, hydraulic pressure devices for effecting this operation are indicated, and by hydraulic, of course, is intended to be included glycerine or any known and commercially acceptable fluid medium for transmitting thrust from a foot-lever-actuated piston to brake-element-actuating-pistons. A form of such devices is seen in dotted lines in Figures 1, 2, and 4 and in full lines in Figures 3, 5, and 6. As shown, diametrically-opposite piston rods 45, 45 extend through a portion of hub 8, through disc 30, and into operating engagement with disc 28. Each piston rod 45 slides freely through disc 30, and its anchorage to disc 28 may be effected in any appropriate manner, such as by threading the outer end portion of the respective piston rod and threading the same into engagement with the disc, and then providing a locking nut 46 disposed outward of the disc 28. The inner portion of each piston rod 45 terminates in a piston head 47 located in a cylindrical recess 48 in the hub 8, and snugly fitting said cylindrical recess with a non-leaking engagement with the walls thereof. A port 49 leads from the inner face of the swiveled hub 8 inward to the inner extremity of each cylindrical opening 48 and is preferably provided with a nipple 50 engaged by a flexible hose 51 connected with the source of pressure fluid supply, not illustrated, but which, of course, is of the usual and well known form of foot-lever-actuated, cylindrical-enclosed piston. To prevent access of foreign substance, each of the cylindrical openings 48 is preferably closed by a plug or other appropriate cap 52, which is adequately vented to enable ingress and egress of air consistent with strokes of piston 47. Thus it will be seen that when the operator imparts an impulse to the motor fluid in the tubes 51 and ports 49, the piston heads 47 will be thereby thrust inward and incident to such movement piston rods 45 will pull disc 28 inward first into contact with annulus 33 (or its brake lining) sufficiently for shifting said annulus inward into contact with braking disc 30, and then as the piston 47 moves slightly further inward braking occurs to the extent required by the operator. On releasing the impulse-producer for the pressure fluid, the pistons 47 travel outward under the relaxing stress of springs 32, and the parts thus return to their initial, non-braking position ready for repetition of the operation.

Extending through the bore 4 of section 2 of axle 1 is a power or drive shaft 53 which, though broken off in the figures of the drawings, will be understood as extending from any appropriate source of power, such as a differential gear, or other appropriate driving means, and, of course, the shaft will be appropriately housed, as indicated at 54, which housing is detachably connected to axle 1 preferably by being fixed to the inner end of section 2. The shaft 53 is sustained by appropriate anti-friction bearings 55, 55, disposed at the respective ends of the bore 4 of section 2, and the form of such bearings may, of course, be modified according to preference and the stresses to be carried. End thrust is resisted by an appropriate shoulder 56 at the outer end of shaft 53 engaging one of the raceways of the outer bearing 55, while the corresponding raceway of the other bearing is engaged by a similarly functioning element carried by shaft 53, which element may be, as illustrated, in the form of threaded rings or nuts 57. Outward of shoulder 56, shaft 53 is provided with an appropriate flexing joint, preferably of the ordinary universal type, as indicated at 58, the outer element of which carries the terminal cone 59 of the shaft 53. Extending inward axially and located centrally of and preferably formed integral with the hub cap 34 is a boss 60, which is preferably frusto-conical in exterior contour and has a tapered bore located and proportioned to receive the conical terminal portion 59 of shaft 53. The bore of the boss 60 opens into a recess or pocket 61, which extends outward through the cap 34 and is adapted to be closed by a supplemental cap 62 threaded or otherwise appropriately detachably connected to the main cap 34. The recess 61 is sufficiently larger than the outer end of the tapered bore of boss 60 to leave an annular shoulder 63, and the conical portion 59 of shaft 53 terminates in a threaded extension 64 projecting beyond the shoulder 63 and engaged by a retaining nut 65, which nut lies in face engagement with shoulder 63 and is adapted thereby, when threaded home, to draw the conical terminal portion 59 into such intimate contact with the conical bore of boss 60 as to enable delivery of power without slippage between said parts. The hub cap 34 is sturdily constructed of sufficient stability to serve both as a cap for the contained parts and support for the braking annulus 33, and also for delivering power to wheel 12 from shaft 53. The universal joint 58 is, of course, susceptible of a wide range of modification, but is, preferably, located with the axes of its pivots in substantially the same transverse planes of the wheel 12 as that occupied by the pivotal axis of the swiveled hub 8. The furcations 5 are spaced apart sufficiently to accommodate the universal joint 58 therebetween, and, since the projections 5 are furcations and not boxed in, the open sides allow all necessary lateral play of the swinging part of the universal joint and parts connected therewith incident to swiveling action of the wheel while power continues to be applied to the wheel.

The connections for steering by which the wheel 12 is shifted on its swivel axis are, of course, capable of any appropriate degree of modification, and any ordinary steering linkage may be employed, such, for instance, as is adapted for anchorage to an eye 66 extending inward from and preferably formed integral with the inner face of swiveled hub 8.

The ease and facility with which dismantling and assemblage may be accomplished is believed to be obvious. Accessibility with facility is maximum. Removal of the nuts from bolts 15 and of the nut 65, and axial withdrawal of the cap 34 is all that is required to afford full access to the brake for repair or renewal of parts, and the brake itself can be readily withdrawn by detaching the nuts 46 from piston 45, and removing the cotter pins or other detents at the outer end portion of the studs 27. The braking disc 28 will thus be made free to be axially withdrawn and with it the braking ring 33 may be similarly withdrawn, and then, by unscrewing studs 27, disc 30 may be removed and ring 17 rendered accessible, which latter, upon being removed, leaves the wheel 12 and the engaging interposed bearings 3 to be axially withdrawn from swiveled hub 8. After such withdrawal, the trunnions 6 may be removed, and the swiveled hub thus detached from the axle portion 2. Access to the universal joint 58 is had as soon as the disc 30 has been removed, and the housing 54 is preferably made of detachable sections to facilitate access to the nuts 57, which, upon being backed off, will leave the axle 53 free to be withdrawn.

The operation should be apparent, but may be briefly stated as follows:—

Steering is effected by swinging wheel 12 pivotally on its swiveled trunnions 6 by linkage engaging eye 66, and this action in no way interferes with the braking operations or with the delivery of power to the wheel. The braking operations are effected by successive introduction of pressure fluid into the cylinders 48 outward of the piston head 47, and intervening relaxation thereof is accomplished without in any way interfering with the steering operation or the delivery of power to the wheel 12. Power is delivered through shaft 53, its universal joint 58 and hub cap 34 to wheel 12, and incident to the presence of the flexible connection provided by universal joint 58 such power delivery continues without regard to angular adjustments of wheel 12 during steering operations. Thus, steering, braking, and power delivery are accomplished with respect to the wheel 12 without in any way having any of the manipulations or operations conflict with or tend to reduce the efficacy of any of the others.

While, of course, entirely optional, it is feasible with a structure possessing the details illustrated in the drawings and set forth above to lubricate the braking parts where sufficient power of application of the braking discs is employed to effect braking action notwithstanding the lubricant, and, in that event, a column or body of fluid lubricant may be deposited in the hub cap 34 and will largely remain by gravity in the lower portion of the cap. Similarly, the bearing space between hub 13 and hub 8 may be supplied with lubricant, and in both instances, of course, the lubricant will be elevated by the revolving elements and distributed to upper parts, and such lubricant within the hub 13 will drip by gravity upon other parts and thus effect distribution. The universal joint may be packed with solid or semi-solid lubricant, and the detachable casing 54 as well as bore 4 similarly supplied with lubricant, or the lubricant may be delivered to the last-named parts from the differential gear housing, not illustrated, with which the casing 54 connects and communicates. Obviously, when the disc 30 is not proportioned and located to seal the outer end of the hub 13, the supply of lubricant in the lower portions of the hub and hub cap 34 may intercommunicate.

What is claimed is:

1. The combination, with a load-carrying axle and a carrying wheel swiveled directly to a rigid portion of said axle, of a brake housing outward of the wheel, and driving means engaging said housing for delivering power to the wheel while leaving the same free for swiveling movement.

2. The combination as claimed in claim 1 wherein the driving means includes a universal joint within the wheel.

3. The combination as claimed in claim 1 wherein the brake housing is located outward beyond the end of the axle.

4. The combination, with a load-carrying axle and a wheel swiveled thereto and journaled thereon, of a cap for the hub of said wheel comprising a brake housing proportioned to contain a brake, and driving means for delivering power to said hub cap.

5. The combination as claimed in claim 4 wherein the driving means comprises a shaft extending through the axle and having a universal joint whose axes of movement are located substantially in the plane of the axis of the swiveling of the wheel.

6. The combination as claimed in claim 4 wherein the hub cap is located sufficiently outward of the wheel for containing braking mechanism located outward beyond the end of the axle.

7. The combination, with a load-carrying axle having a main portion and an offset, substantially horizontal, rigid portion, having a longitudinal bore, and a wheel swiveled to and journaled on said rigid offset portion of axle, of a drive shaft extending longitudinally through the bore of said offset portion of axle independently of the main portion of the axle, and means outward of the wheel for delivering power from said shaft to the wheel.

8. The combination as claimed in claim 7 wherein the means for delivering power from the shaft to the wheel is a brake housing.

9. The combination, with a rigid load-carrying axle and a wheel swiveled to and journaled on a rigid portion of said axle, of a drive shaft extending longitudinally through a portion of the axle, and a brake housing for the wheel located outward of the wheel and connected to deliver power from the shaft to the wheel.

HOMER T. LAMBERT.